(12) United States Patent
Flandrinck

(10) Patent No.: US 7,673,483 B2
(45) Date of Patent: Mar. 9, 2010

(54) ANTI-THEFT DEVICE FOR A MOTOR VEHICLE, SUCH AS AN ELECTRONIC ANTI-THEFT DEVICE

(75) Inventor: Christian Flandrinck, St. Pierre le Moutier (FR)

(73) Assignee: Valeo Securite Habitacle, Creteil Cedex (FR)

( * ) Notice: Subject to any disclaimer, the term of this patent is extended or adjusted under 35 U.S.C. 154(b) by 1239 days.

(21) Appl. No.: 10/535,831

(22) PCT Filed: Dec. 3, 2003

(86) PCT No.: PCT/EP03/50934

§ 371 (c)(1),
(2), (4) Date: May 20, 2005

(87) PCT Pub. No.: WO2004/052698

PCT Pub. Date: Jun. 24, 2004

(65) Prior Publication Data

US 2006/0164216 A1   Jul. 27, 2006

(30) Foreign Application Priority Data

Dec. 6, 2002   (FR) .................................. 02 15467

(51) Int. Cl.
*B60R 25/02* (2006.01)

(52) U.S. Cl. .......................... 70/252; 70/257; 70/278.7; 70/279.1; 70/DIG. 30

(58) Field of Classification Search ........... 70/182–186, 70/252, 257, DIG. 30, 277, 278.2, 278.3, 70/278.7, 279.1, 245–251; 200/43.08; 307/10.3–10.6
See application file for complete search history.

(56) References Cited

U.S. PATENT DOCUMENTS 1,695,518 A * 12/1928 Watson ........................ 70/277

(Continued)

FOREIGN PATENT DOCUMENTS

EP       0 336 219 A    10/1989

(Continued)

*Primary Examiner*—Lloyd A Gall
(74) *Attorney, Agent, or Firm*—Berenato & White, LLC

(57) ABSTRACT

This anti-theft device includes a stator (12), a rotor (14) mounted to rotate in the stator (12) between a first extreme angular position known as the "off" position and at least one second angular position, and a member (22) for interrupting the return travel of the rotor (14) from the second position to the "off" position in a position known as the "non-return" position interpolated angularly between the second position and "off" position, the interrupting member (22) being electrically deactivatable. The anti-theft device further includes a mechanical member (32) for deactivating the interrupting member (22).

15 Claims, 3 Drawing Sheets

U.S. PATENT DOCUMENTS

| | | | | |
|---|---|---|---|---|
| 1,833,572 | A * | 11/1931 | Hardesty | 70/262 |
| 2,215,162 | A * | 9/1940 | Harrison | 200/43.08 |
| 3,543,040 | A * | 11/1970 | Nemeth | 307/10.4 |
| 4,603,564 | A * | 8/1986 | Kleinhany et al. | 70/277 |
| 4,716,748 | A * | 1/1988 | Watanuki et al. | 70/252 |
| 4,789,859 | A * | 12/1988 | Clarkson et al. | 340/5.65 |
| 4,805,427 | A * | 2/1989 | Bates et al. | 70/264 |
| 4,905,487 | A * | 3/1990 | Morikawa et al. | 70/186 |
| 4,982,584 | A * | 1/1991 | Takeda et al. | 70/252 |
| 5,094,093 | A * | 3/1992 | Ben-Asher | 70/278.2 |
| 5,255,547 | A * | 10/1993 | Burr et al. | 70/252 |
| 5,487,289 | A * | 1/1996 | Otto et al. | 70/279.1 |
| 5,656,867 | A * | 8/1997 | Kokubu | 307/10.5 |
| 6,354,120 | B1 * | 3/2002 | Tan et al. | 70/252 |

FOREIGN PATENT DOCUMENTS

| | | |
|---|---|---|
| EP | 1 106 452 A | 6/2001 |
| EP | 1 228 932 A | 8/2002 |

* cited by examiner

ANTI-THEFT DEVICE FOR A MOTOR VEHICLE, SUCH AS AN ELECTRONIC ANTI-THEFT DEVICE

FIELD OF THE INVENTION

The present invention relates to an anti-theft device for a motor vehicle, particularly one of the electronic type.

BACKGROUND OF THE INVENTION

An anti-theft device for a motor vehicle, of the type comprising:
- a stator,
- a rotor mounted to rotate in the stator between a first extreme angular position known as the "off" position and at least one second angular position, and
- means for interrupting the return travel of the rotor from the second position to the "off" position in a position known as the "non-return" position interpolated angularly between the second position and "off" position, these interrupt means being electrically deactivatable is already known in the state of the art.

An anti-theft device of electronic type advantageously has the above characteristics.

An electronic anti-theft device generally comprises a control knob, which rotates as one with the rotor, forming a member for manually controlling the starting of the engine of the vehicle and for locking the vehicle steering column.

With a view to allowing the steering column to be unlocked, an electronic anti-theft device comprises an electronic identification device particularly consisting of an electronic identifier worn or carried by an authorized user of the vehicle, and a unit for identifying this authorized user, carried on board the vehicle. The electronic identifier may, for example, have the appearance of a key or of a badge.

With a view to initiating the starting of the engine, the electronic anti-theft device comprises a multi-position electric rotary switch that rotates as one with the rotor. This rotary switch allows the starting of the engine to be controlled. What happens is that the control knob can be placed successively in a first extreme angular position of rest known as the "off" position, in an intermediate angular position known as the "on" position, and in a second extreme angular position, at the opposite extreme to the first extreme position, known as the "start" position. Starting out from the "off" position, the angular travel of the control knob is, for example, about 90° to reach the "on" position and about 130° to reach the "start" position.

It will be noted that, in general, the locking of the steering column is rendered possible only when the control knob and the rotor are in the "off" position.

Certain regulations dictate that, in a vehicle of the type having an automatic gearbox, return of the control knob (which rotates as one with the rotor) from its "on" position to its "off" position be prevented while the gear selector has not been returned to the "park" position. The user is thus alerted to this situation.

The means of interrupting the return travel of the rotor allow this regulation to be complied with by allowing the rotor to be immobilized in the "non-return" position which is situated, for example, 45° away from the "off" position.

The means of interrupting the return travel of the rotor generally comprise an electromagnet, borne by the stator, equipped with a rod (plunger) that can be moved between a projecting position, in which this rod can engage with the rotor in order to immobilize it, and a retracted position in which this rod is clear of the rotor. The rod is returned elastically to its projecting position by mechanical means. The rod is urged towards its retracted position, against its return force, by applying power to the electromagnet. When the electromagnet is not powered the rod is therefore returned elastically to the projecting position.

However, when the electromagnet is not powered, the rotor is immobilized by the rod of this electromagnet only if this rod is aligned with a corresponding orifice for accommodating the rod, formed in the rotor.

Thus, the rotor usually comprises a "non-return" orifice into which the rod of the electromagnet automatically fits when the rotor is in the non-return position and the automatic gearbox selector is not in its "park" position.

The rotor may also comprise another orifice into which the rod of the electromagnet fits when the rotor is in the "off" position and an authorized user has not been recognized by the identification device, so as to lock the rotor in this "off" position.

Through a quest for standardization by limiting the number of types of anti-theft device, an electronic anti-theft device comprising the function described hereinabove for locking the rotor in the "non-return" position may be fitted to a vehicle equipped with a non-automatic gearbox. In this case, this function is not used.

Nonetheless, whether or not the vehicle to which the anti-theft device is fitted is equipped with an automatic gearbox, if there is an electrical failure preventing the electromagnet from being powered, when the user moves the control knob from its "on" position to its "off" position, the rod of the electromagnet, returned elastically to the projecting position, fits automatically into the "non-return" orifice of the rotor so as to lock the control knob and the rotor in the "non-return" position.

Now, certain regulations demand that, in spite of the above electrical failure and the fact that it is impossible to power the electromagnet in the normal way, it must be possible for the control knob to be returned to the "off" position in order to be able to lock the steering column and protect the vehicle against theft.

BRIEF SUMMARY OF THE INVENTION

It is an object of the invention to propose an anti-theft device of the aforementioned type that makes it possible in particular, in a context of electrical failure of the anti-theft device or of its electrical power supply, to return the control knob to the "off" position after this control knob has been locked in the "non-return" position.

To this end, the subject of the invention is an anti-theft device for a motor vehicle, of the aforementioned type, characterized in that it comprises mechanical means for deactivating the means for interrupting the return travel of the rotor.

The mechanical means for deactivating the means for interrupting the return travel of the rotor make it possible, in the context of an electrical failure of the anti-theft device or of its electrical power supply, for the rotor to be returned to the "off" position after this rotor has been locked in the "non-return" position.

According to other optional features of this anti-theft device:
- the means for interrupting the return travel of the rotor comprise complementary travel-interrupting stops borne respectively by the rotor and by a translationally mobile rod of an electromagnet borne by the stator;

the mechanical means for deactivating the means for interrupting the return travel of the rotor are borne by this rotor;

the mechanical means for deactivating the means for interrupting the return travel of the rotor comprise an operating member mounted so that it can move translationally in the rotor more or less parallel to the rod of the electromagnet;

the operating member is arranged in a more or less axial housing formed in the rotor, this housing communicating with the outside of the rotor to allow a member for actuating the operating member, for example having the appearance of a key, to be introduced into the rotor;

the mechanical means for deactivating the means for interrupting the return travel of the rotor comprise a rocker mounted articulated in the rotor about an axis more or less orthogonal to the directions of travel of the electromagnet rod and of the operating member, this rocker comprising a first arm intended to collaborate with the operating member and a second arm intended to collaborate with the electromagnet rod;

the operating member is returned elastically to a position separated from the rocker;

the rotor comprises a tubular member delimiting the housing of the operating member, equipped with a distal end that rotates as one with a disk bearing the rocker, and with a proximal end bearing a knob for controlling the rotor;

the control knob is equipped with a more or less axial drilling for the passage of the member that actuates the operating member;

the rotor can be moved between the "off" position and a second extreme angular position known as the "start" position, it being possible for the rotor to be positioned, between its "off" and "start" positions in an intermediate angular position known as the "on" position, the "non-return" position being positioned between the "off" and "on" positions.

BRIEF DESCRIPTION OF THE SEVERAL
VIEWS OF THE DRAWING(S)

The invention will be better understood from reading the description which will follow, given solely by way of example and made with reference to the drawings in which.

DETAILED DESCRIPTION OF EXEMPLARY
EMBODIMENTS OF THE INVENTION

Figure 1:
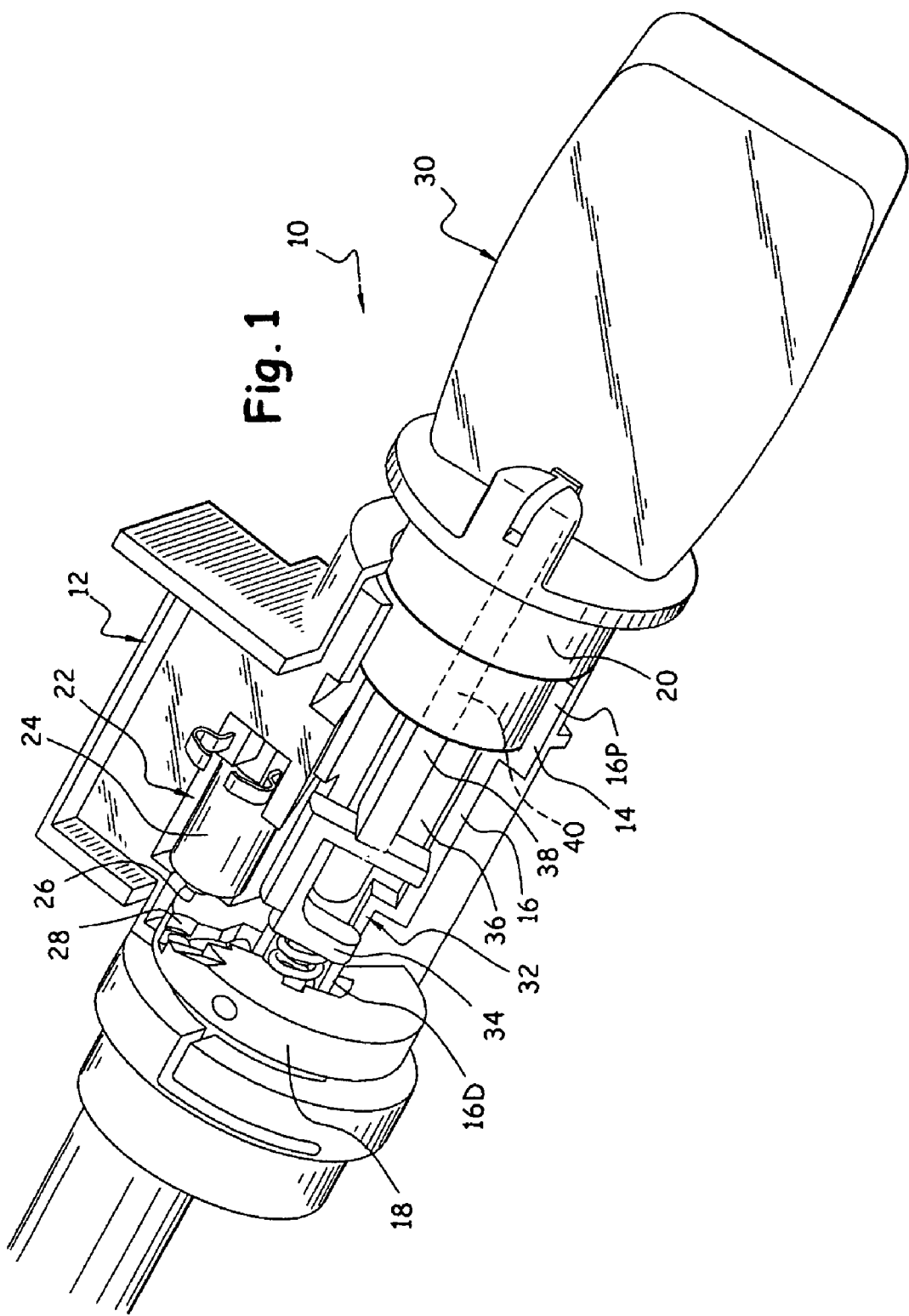
FIG. 1 is a view in perspective, with part section, of an anti-theft device according to the invention.

FIG. 1 depicts an electronic anti-theft device for a motor vehicle, according to the invention, denoted by the general reference 10. This anti-theft device 10 is intended to control the starting of the engine of the vehicle and the locking of the steering column of the vehicle.

In the example illustrated, the anti-theft device 10 is of the electronic type and is fitted to a vehicle equipped with an automatic gearbox.

The anti-theft device 10 comprises a stator 12 and a rotor 14 mounted to rotate in the stator 12. In the example illustrated, the rotor 14 comprises a tubular member 16 equipped with a distal end 16D that rotates as one with a disk 18, and with a proximal end 16P bearing a control knob 20 for controlling the rotor.

The control knob 20 is coupled in rotation to the proximal end 16P of the tubular member 16 using conventional means.

With a view to controlling the starting of the engine of the vehicle, the rotor 14 is coupled to a multi-position electrical rotary switch. This rotary switch is of conventional type.

Thus, the rotor 14 and the control knob 20 may be placed successively in a first extreme angular position of rest known as the "off" position, in an intermediate angular position known as the "on" position and in a second extreme angular position, at the opposite extreme to the first extreme position, known as the "start" position. Starting out from the "off" position, the angular travel of the rotor 14 and of the control knob 20 is, for example, about 90° to reach the "on" position and about 130° to reach the "start" position.

As an alternative, the rotor 14 and the control knob 20 could be placed in more than just one intermediate angular position.

The anti-theft device 10 comprises means 22 for interrupting the return travel of the rotor 14 and of the control knob 20 from the "on" position to the "off" position. These means 22 make it possible to interrupt this return travel in a position known as the "non-return" position interpolated angularly between the "on" and "off" positions. This "non-return" position is therefore a position interrupting the travel of the rotor 14 and of the control knob 20 when these items are moving from the "on" position to the "off" position so that they cannot reach this "off" position as long as the means 22 have not been canceled.

In the example illustrated, the means 22 for interrupting the return travel of the rotor 14 comprise an electromagnet 24, borne by the stator 12, equipped with a rod 26 (plunger) that can move translationally between a projecting position in which this rod 26 is able to engage with the disk 18 to immobilize it, and a retracted position in which this rod 26 is separated from the disk 18.

In a conventional way, the rod 26 is elastically returned to its projecting position by mechanical means generally comprising a spring. The rod 26 is urged towards its retracted position, against its return force, by powering the electromagnet.

The means 22 for interrupting the return travel of the rotor 16 can therefore be electrically deactivated. When the electromagnet 24 is not powered the rod 26 is elastically returned to the projecting position.

The means 22 for interrupting the return travel of the rotor 14 also comprise a "non-return" orifice 28 formed in the disk 18, into which the rod 26 fits automatically in the projecting position when, as is customary, the rotor 14 is in the "non-return" position and the automatic gearbox selector is not in its "park" position.

It will therefore be noted that the rod 26 and the "non-return" orifice 28 form complementary stops for interrupting the return travel of the rotor 14 towards the "off" position.

In general, the locking of the steering column is rendered possible only when the rotor 14 and the control knob 20 are in the "off" position.

With a view to permitting the steering column to be unlocked, the anti-theft device 10 generally comprises an electronic identification device consisting in particular of an electronic identifier worn or carried by the authorized user of the vehicle, and of a unit for identifying this authorized user, carried on board the vehicle. The electronic identifier may, for example, have the appearance of a key 30 as depicted in FIG. 1.

In addition to the "non-return" orifice, the disk 18 may comprise another orifice, known as the "off" orifice, into which the rod 26 of the electromagnet fits when the rotor 14 and the control knob 20 are in the "off" position and an authorized user has not been recognized by the identification device, this being so as to lock the rotor 14 and the control knob 20 in the "off" position.

According to the invention, the anti-theft device 10 comprises mechanical means 32 for deactivating the means 22 for interrupting the return travel of the rotor 14. As a preference, these means 32 are borne by the rotor 14.

In the example illustrated, the means 32 for deactivating the means 22 for interrupting the return travel of the rotor 14 comprise an operating member 34 mounted translationally mobile in the rotor 14, more or less parallel to the rod 26 of the electromagnet.

More specifically, it will be noted that the tubular member 16 delimits a more or less axial housing 36 in which the operating member 34 is arranged and guided.

The housing 36 communicates with the outside of the rotor 14 to allow a member for actuating the operating member 34 to be introduced into this rotor 14. In the example illustrated, this actuating member consists of a bit 38 of the key 30.

It will be noted that the control knob 20 is equipped with a more or less axial drilling 40 for the passage of the bit 38 intended to collaborate with the operating member 34.

As a preference, the means 32 for deactivating the means 22 for interrupting the return travel of the rotor 14 comprise a rocker 42, mounted articulated on the disk 18 about an axis more or less orthogonal to the directions of travel of the electromagnet rod 26 and of the operating member 34.

This rocker 42 comprises a first arm 42A intended to collaborate with the operating member and a second arm 42B intended to collaborate with the electromagnet rod 26 in order to move it towards its retracted position.

It will be noted that the operating member 34 is elastically returned to a position away from the rocker 42 by a spring 44.

The rocker 42 is positioned on the disk 18 in such a way that the second arm 42B is more or less in the axial continuation of the electromagnet rod 26 when the rotor 14 and the control knob 20 are in the "non-return" position which is situated, for example, 45° away from the "off" position.

It will be noted that the second arm 42B of the rocker is able to move more or less axially through the "non-return" orifice 28 so as to free the electromagnet rod 26 from this orifice 28.

The main aspects of the operation of the anti-theft device 10 which are associated with the invention will be described hereinbelow.

Figure 2:
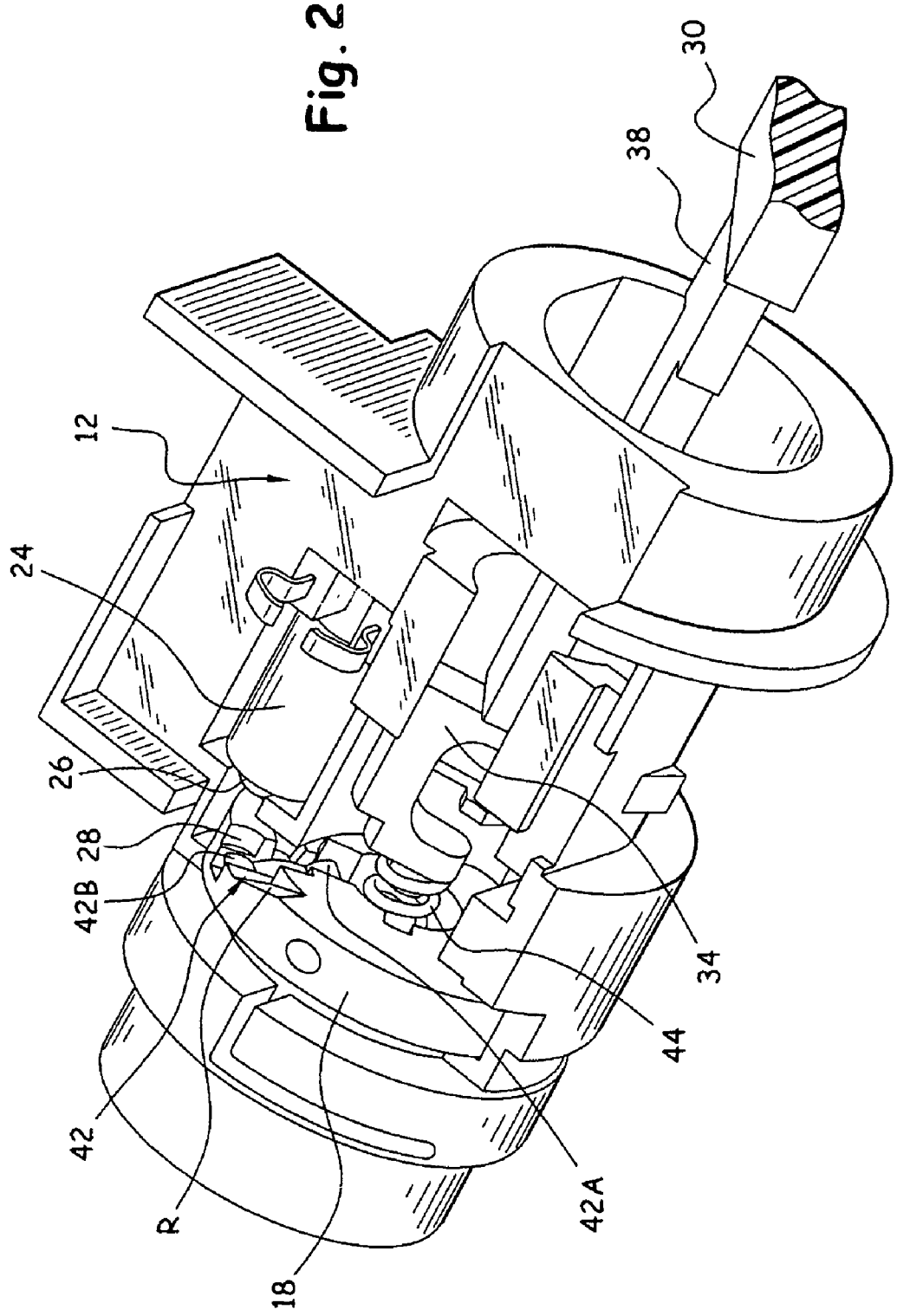
FIGS. 2 to 4 are perspective views of certain parts only of the anti-theft device depicted in FIG. 1, showing this anti-theft device in various operating configurations.

The rotor 14 and the control knob 20 are initially considered in the "off" position as depicted in FIGS. 1 and 2.

Normally, unlike that which is depicted in the figures, the key 30 is not introduced into the rotor 14.

An authorized user wishing to start the vehicle first of all moves the control knob 20 and the rotor 14 to the "on" position. As the electromagnet 24 is not powered, its rod 26 is elastically returned to the projecting position in which it collaborates with a face opposite it belonging to the disk 18. During the angular travel of this disk 18 from the "off" position to the "on" position, the rod 26 fits automatically into the "non-return" orifice 28 then disengages therefrom by collaborating with a ramp R that angularly extends this orifice 28.

By then continuing the angular travel of the control knob 20 and of the rotor 14 as far as the "start" position, the user can start the vehicle.

Once the vehicle has started, the control knob 20 is returned elastically, in the way known per se, to its "on" position.

Consider the subsequent onset of an electrical failure which, in particular, prevents the electromagnet 24 from being powered.

When the user tries to return the control knob 20 and the rotor 14 from the "on" position to the "off" position, the electromagnet rod 26, elastically returned to the projecting position, fits automatically into the "non-return" orifice 28 so as to immobilize the rotor 14 and the control rod 20, by way of the disk 18, in the "non-return" position.

Figure 3:
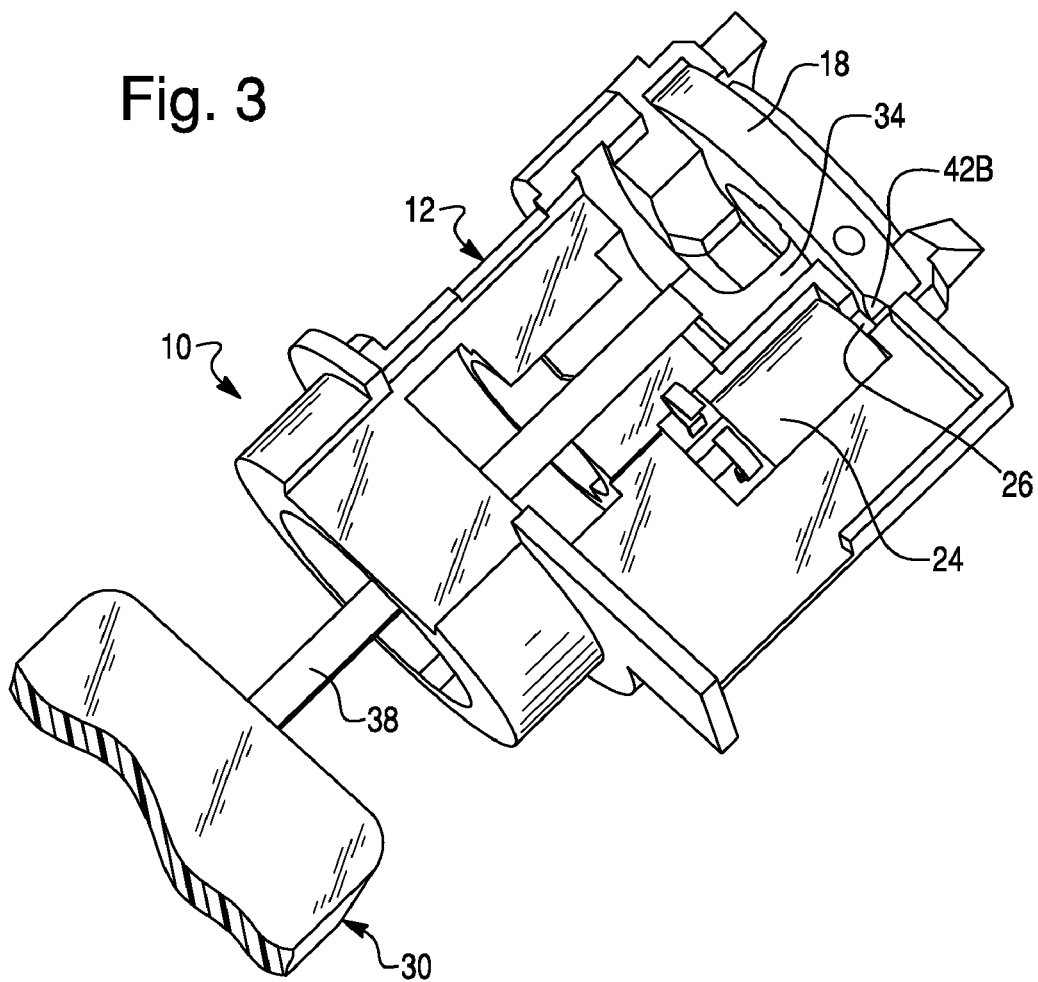
Figure 4:
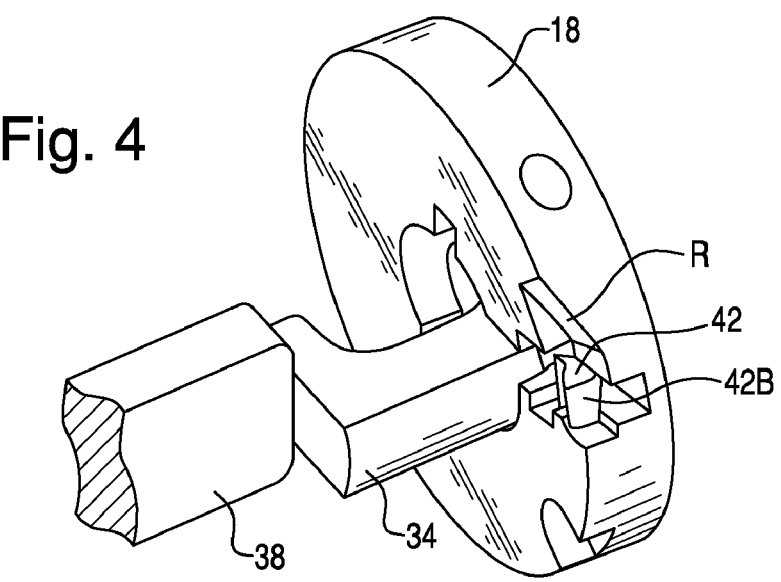

In order to be able to return the rotor 14 and the control knob 20 to the "off" position, the user introduces the bit 38 into the drilling 40 in the control knob 20. This bit 38 then urges the operating member 34 against the return force of the spring 44. This operating member 34 thus collaborates with the first arm 42A of the rocker, such that the second arm 42B of this rocker urges the electromagnet rod 26 against its elastic return force and disengages this rod 26 from the "non-return" orifice 28, as depicted in FIGS. 3 and 4.

It has therefore become possible again for the rotor 14 to be moved to the "off" position which means that the user can position this rotor 14 in the "off" position in order, in particular, to allow the steering column to be locked.

The invention claimed is:

1. An anti-theft device for a motor vehicle, comprising:
a stator (12),
a rotor (14) mounted to rotate in the stator (12) between a first angular position known as the "off" position and at least one second angular position,
electrically deactivatable interrupt means (22) for interrupting return travel of the rotor (14) from the second angular position to the "off" position in a position known as the "non-return" position interpolated angularly between the second angular position and the "off" position, and
mechanical means (32) for non-electrically deactivating the interrupt means (22) and thereby permitting return of the rotor from the "non-return" position to the "off" position without electric power,
wherein the interrupt means (22) for interrupting the return travel of the rotor (14) comprise a complementary travel-interrupting stop (28) borne by a disk (18) which rotates with the rotor (14) and a translationally mobile rod (26) of an electromagnet (24) borne by the stator (12).

2. The anti-theft device as claimed in claim 1, wherein at least some of the components of the mechanical means (32) are borne by the rotor (14).

3. The anti-theft device as claimed in claim 2, wherein the mechanical means (32) comprise an operating member (34) mounted so that it can move translationally in the rotor (14) substantially parallel to the rod (26) of the electromagnet.

4. The anti-theft device as claimed in claim 3, wherein the operating member (34) is arranged in an axial housing (36) of the rotor (14), the housing (36) communicating with the outside of the rotor (14) to allow a key (30, 38) to be introduced into the rotor (14).

5. The anti-theft device as claimed in claim 4, wherein the mechanical means (32) comprise a rocker (42) articulated about an axis substantially orthogonal to the directions of travel of the rod (26) and of the operating member (34), the rocker (42) comprising a first arm (42A) for collaborating with the operating member (34) and a second arm (42B) for collaborating with the rod (26).

6. The anti-theft device as claimed in claim 5, further comprising a member (44) for elastically urging the operating member (34) to return to a position separated from the rocker (42).

7. The anti-theft device as claimed in claim 5, wherein the rotor (14) comprises a tubular member (16) delimiting the housing (36) of the operating member (34), equipped with a distal end (16D) that rotates as one with the disk (18) bearing the rocker (42), and with a proximal end (1 6P) bearing a control knob (20) for controlling the rotor (14).

8. The anti-theft device as claimed in claim 7, wherein the control knob (20) is equipped with a substantially axial drilling (40) for the passage of the key (38) that actuates the operating member (34).

9. The anti-theft device as claimed in claim 1, wherein the rotor (14) is movable between the "off" position and a "start" position, it being possible for the rotor (14) to be positioned, between its "off" and "start" positions in an intermediate angular position known as the "on" position, the "non-return" position being positioned between the "off" and "on" positions.

10. The anti-theft device as claimed in claim 1, wherein the mechanical means (32) comprise an operating member (34) mounted so that it can move translationally in the rotor (14) substantially parallel to the rod (26) of the electromagnet.

11. The anti-theft device as claimed in claim 4, wherein the mechanical means (32) comprise a rocker (42) articulated about an axis substantially orthogonal to the directions of travel of the rod (26) and of the operating member (34), the rocker (42) comprising a first arm (42A) for collaborating with the operating member (34) and a second arm (42B) for collaborating with the electromagnet rod (26).

12. The anti-theft device as claimed in claim 6, wherein the rotor (14) comprises a tubular member (16) delimiting the housing (36) of the operating member (34), equipped with a distal end (16D) that rotates as one with the disk (18) bearing the rocker (42), and with a proximal end (16P) bearing a knob (20) for controlling the rotor (14).

13. An anti-theft device, comprising:
a stator,
a rotor mounted to rotate in the stator between an "off" position and at least one angular position,
an interrupter comprising a stopper, the interrupter being electrically deactivatable for permitting the stopper to lock the rotor in a "non-return" position during return travel of the rotor from the angular position to the "off" position, and electrically activatable for causing the stopper to not interrupt return travel of the rotor from the angular position to the "off" position; and
a mechanical mechanism non-electrically activatable for unlocking the rotor from the "non-return" position and allowing return of the rotor to the "off" position without requiring electrical activation of the interrupter;
a spring for elastically urging a rod of the stopper into a projecting position in which the rod is received in a complementary hole to thereby lock the rotor in the "non-return" position;
an operating member translationally movable substantially parallel to the rod of the electromagnet; and
a rocker articulated about an axis substantially orthogonal to the directions of travel of the rod and of the operating member, the rocker comprising a first arm for collaborating with the operating member and a second arm for collaborating with the rod,
wherein the interrupter comprises an electromagnet which, in an electrically activated state, overcomes the urging force of the spring and retracts the rod so as not to be received in the complementary hole.

14. An anti-theft device of a vehicle, comprising:
a stator,
a rotor mounted to rotate in the stator between an "off" position, a "start" position, and an "on" position interposed between the "off" and "start" positions,
an interrupter comprising a stopper, the interrupter being electrically deactivatable for permitting the stopper to lock the rotor in a "non-return" position during return travel of the rotor from the "on" position to the "off" position, and electrically activatable for causing the stopper to not interrupt return travel of the rotor from the "on" position to the "off" position; and
a mechanical mechanism non-electrically activatable for unlocking the rotor from the "non-return" position and allowing return of the rotor to the "off" position without requiring electrical activation of the interrupter;
an operating member translationally movable substantially parallel to the rod of the electromagnet; and
a rocker articulated about an axis substantially orthogonal to the directions of travel of the rod and of the operating member, the rocker comprising a first arm for collaborating with the operating member and a second arm for collaborating with the rod;
a spring for elastically urging a rod of the stopper into a projecting position in which the rod is received in a complementary hole to thereby lock the rotor in the "non- return" position,
wherein the interrupter comprises an electromagnet which, in an electrically activated state, overcomes the urging force of the spring and retracts the rod so as not to be received in the complementary hole.

15. An anti-theft device for a motor vehicle, comprising:
a stator (12),
a rotor (14) mounted to rotate in the stator (12) between a first angular position known as the "off" position and at least one second angular position,
electrically deactivatable interrupt means (22) for interrupting return travel of the rotor (14) from the second angular position to the "off" position in a position known as the "non-return" position interpolated angularly between the second angular position and the "off" position wherein the interrupt means (22) for interrupting the return travel of the rotor (14) comprise a complementary travel-interrupting stop (28) borne by a disk (18) which rotates with the rotor (14) and a translationally mobile rod (26) of an electromagnet (24) borne by the stator (12), and
mechanical means (32) for non-electrically deactivating the interrupt means (22) and thereby permitting return of the rotor from the "non-return" position to the "off" position without electric power wherein at least some of the components of the mechanical means (32) are borne by the rotor (14).

* * * * *